(12) United States Patent
Flores

(10) Patent No.: US 12,492,718 B2
(45) Date of Patent: Dec. 9, 2025

(54) UNIVERSAL BEAM CLAMP

(71) Applicant: Victor Manuel Flores, Santa Cruz, CA (US)

(72) Inventor: Victor Manuel Flores, Santa Cruz, CA (US)

( * ) Notice: Subject to any disclaimer, the term of this patent is extended or adjusted under 35 U.S.C. 154(b) by 0 days.

(21) Appl. No.: 18/612,908

(22) Filed: Mar. 21, 2024

(65) Prior Publication Data

US 2025/0297627 A1 Sep. 25, 2025

Related U.S. Application Data

(63) Continuation of application No. 18/313,600, filed on May 8, 2023, now abandoned.

(51) Int. Cl.
*F16B 2/06* (2006.01)
(52) U.S. Cl.
CPC .................................. *F16B 2/065* (2013.01)
(58) Field of Classification Search
CPC ............................. F16B 2/065; H02S 20/23
See application file for complete search history.

(56) References Cited

U.S. PATENT DOCUMENTS

| | | | | |
|---|---|---|---|---|
| 3,232,393 | A * | 2/1966 | Attwood | E04B 1/38 403/387 |
| 4,666,116 | A * | 5/1987 | Lloyd | F16B 2/065 D8/394 |
| 6,585,207 | B2 * | 7/2003 | Ibbitson | B01L 9/50 248/230.1 |
| 7,410,139 | B1 * | 8/2008 | Rohrich | F16L 3/24 248/302 |
| 8,132,767 | B2 * | 3/2012 | Oh | F16B 35/06 248/220.21 |
| 8,833,714 | B2 * | 9/2014 | Haddock | F24S 25/615 248/500 |
| 8,998,155 | B2 * | 4/2015 | Oh | F16B 35/06 248/220.21 |
| 9,695,848 | B2 * | 7/2017 | Thompson | F16B 2/065 |
| 10,054,143 | B2 * | 8/2018 | Allmon | F16B 7/185 |
| 10,100,973 | B2 * | 10/2018 | Anderson | F16M 13/02 |
| 10,260,544 | B2 * | 4/2019 | Schultz | A01G 9/12 |
| 10,415,616 | B2 * | 9/2019 | Nehls | F16M 13/022 |
| 10,480,553 | B2 * | 11/2019 | Cymbal | F16D 3/44 |
| 10,634,175 | B2 * | 4/2020 | Haddock | F24S 25/63 |
| 10,746,209 | B2 * | 8/2020 | Voegele | B60J 7/198 |
| 10,948,002 | B2 * | 3/2021 | Haddock | H02S 20/23 |

(Continued)

*Primary Examiner* — Jason W San
*Assistant Examiner* — Matthew J Sullivan
(74) *Attorney, Agent, or Firm* — Donald R. Boys; Central Coast Patent Agency LLC

(57) ABSTRACT

A universal beam clamp has a C-shaped body with a central channel, a threaded hole through a first portion of the body to one side of the central channel, a clamp screw engaged in the threaded hole through the first portion of the body, into the central channel, and two threaded holes of different thread size side-by-side at a right angle into the body on the closed end face, two threaded holes of different thread size placed side-by-side at a right angle into the body on one part of the open end face, two threaded holes of different thread size placed side-by-side at a right angle into the body on the top face, and two threaded holes of different thread size placed side-by-side at a right angle into the body on the top face, proximate the second end of the body.

11 Claims, 6 Drawing Sheets

(56) References Cited

U.S. PATENT DOCUMENTS

| | | | | |
|---|---|---|---|---|
| 11,041,310 B1* | 6/2021 | Haddock | ............... | E04D 3/368 |
| 11,183,826 B2* | 11/2021 | Varale | ............... | F16L 3/1033 |
| 11,668,332 B2* | 6/2023 | Haddock | ............... | H02S 20/23 |
| | | | | 52/173.3 |
| 2013/0219678 A1* | 8/2013 | Brewster | ............... | F16B 2/065 |
| | | | | 24/486 |
| 2024/0076887 A1* | 3/2024 | Kuffner | ............... | E04G 21/28 |
| 2024/0106383 A1* | 3/2024 | Recknor | ............... | F16B 2/065 |
| 2024/0352735 A1* | 10/2024 | Moss | ............... | E04D 3/36 |
| 2025/0082098 A1* | 3/2025 | Weiss | ............... | A47B 83/045 |
| 2025/0154971 A1* | 5/2025 | Haddock | ............... | F16B 2/065 |

\* cited by examiner

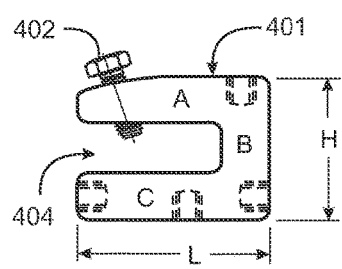 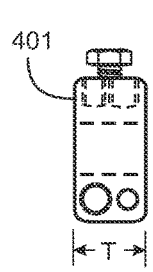 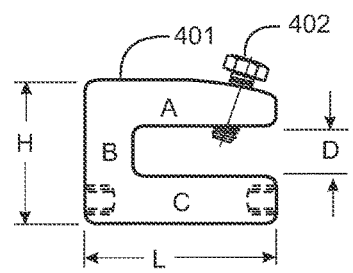 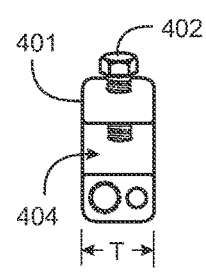
Fig. 4A  Fig. 4B  Fig. 4C  Fig. 4D
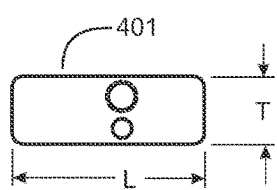 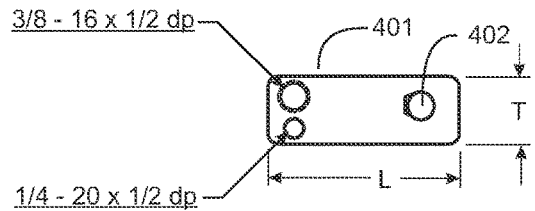
Fig. 4E  Fig. 4F

UNIVERSAL BEAM CLAMP

CROSS-REFERENCE TO RELATED APPLICATIONS

The instant application is a continuation of application Ser. No. 18/313,600 filed May 8, 2023, and claims priority to that application. All disclosure of the parent application is incorporated at least by reference.

BACKGROUND OF THE INVENTION

1. Field of the Invention

The present invention is in the technical field of apparatus and methods in building construction and pertains more particularly to an improved beam clamp for suspending threaded rods to mount such as electrical boxes.

2. Description of Related Art

It is known in the art of building construction to span areas within a building space with steel or aluminum I-beams, T-beams or angle beams, and to suspend threaded rods vertically from threaded holes in clamps attached to the beams. Apparatus, such as electrical switch boxes, for example, may then be attached to and supported by one of the threaded rods. This process of installing and supporting switch boxes is advantageous especially in construction where wooden beams and studs are not used.

The present inventor has deduced that conventional beam clamps are seriously limited in how they may be used to provide anchors for threaded rods. What is clearly needed is a universal beam clamp that may provide substantially enhanced functionality in suspending threaded rods from cross beams in the building trades.

BRIEF SUMMARY OF THE INVENTION

In one embodiment of the invention a universal beam clamp is provided, comprising a substantially C-shaped body having a central channel open on a first end of the body and closed on a second end of the body, the body presenting a bottom face, a top face, a closed-end face, an open-end face, and two opposite side faces, a threaded hole through a first portion of the body to one side of the central channel, proximate the first end, an axis of the threaded hole extending into the central channel, a clamp screw engaged in the threaded hole through the first portion of the body, into the central channel, and two threaded holes of different thread size placed side-by-side at a right angle into the body on the closed end face, two threaded holes of different thread size placed side-by-side at a right angle into the body on one part of the open end face, two threaded holes of different thread size placed side-by-side at a right angle into the body on the top face, and two threaded holes of different thread size placed side-by-side at a right angle into the body on the top face, proximate the second end of the body.

In one embodiment, of the two threaded holes side-by-side, one is for a one-quarter inch thread and the other is for a three-eighths inch thread. Also in one embodiment the first portion of the body to one side of the central channel is tapered toward the open end. In one embodiment the beam clamp is made of one of cold-rolled steel, stainless steel, or cast iron. And in one embodiment the clamp screw is a hex head bolt.

In one embodiment of the universal beam clamp the axis of the threaded hole through the first portion of the body is inclined at an angle to the direction of the central channel. And in one embodiment the angle of inclination is between ten and thirty degrees and the axis is inclined toward the closed end.

In another aspect of the invention a method for suspending a threaded rod from an overhead beam into a building space is provided, comprising engaging a universal beam clamp having a substantially C-shaped body with a central channel open on a first end of the body and closed on a second end of the body, the body presenting a bottom face, a top face, a closed-end face, an open-end face, and two opposite side faces, a threaded hole through a first portion of the body to one side of the central channel, proximate the first end, an axis of the threaded hole extending into the central channel, a clamp screw engaged in the threaded hole through the first portion of the body, into the central channel, and two threaded holes of different thread size placed side-by-side at a right angle into the body on the closed end face, two threaded holes of different thread size placed side-by-side at a right angle into the body on one part of the open end face, two threaded holes of different thread size placed side-by-side at a right angle into the body on the top face, and two threaded holes of different thread size placed side-by-side at a right angle into the body on the top face, proximate the second end of the body, over a wing or web of the overhead beam, such that two threaded holes of different thread size face vertically downward, tightening the clamp screw securing the universal beam clamp to the wing of the overhead beam, and engaging a threaded rod into one of the two threaded holes facing vertically downward.

In one embodiment of the method one of the two threaded holes facing vertically downward is for a one-quarter inch thread and the other is for a three-eighths inch thread, comprising engaging a one-quarter inch threaded rod into the one-quarter inch threaded hole. In one embodiment one of the two threaded holes facing vertically downward is a one-quarter inch thread and the other is a three-eighths inch thread, comprising engaging a one-quarter inch threaded rod into the one-quarter inch threaded hole. In one embodiment one of the two threaded holes facing vertically downward is a one-quarter inch thread and the other is a three-eighths inch thread, comprising engaging a three-eighths inch threaded rod into the three-eighths inch threaded hole.

In one embodiment of the method a wing or web of the overhead beam extends vertically upward, comprising engaging the universal beam clamp over the vertically upward extending wing or web, providing two threaded holes in the open end of the universal beam clamp to face vertically downward, and engaging a threaded rod into one of the two threaded holes in the open end of the universal beam clamp, such that the threaded rod extends vertically downward into the building space.

BRIEF DESCRIPTION OF THE SEVERAL VIEWS OF THE DRAWINGS

FIG. 4A is a side view of a universal beam clamp in an embodiment of the invention.

FIG. 4B is a back-end view of the universal beam clamp of FIG. 4A.

FIG. 4C is a side view opposite FIG. 4A of the universal beam clamp.

FIG. 4D is front-end view of the universal beam clamp of FIG. 4B.

FIG. 4E is a bottom view of the universal beam clamp of FIG. 4A.

FIG. 4F is a top view of the universal beam clamp of FIG. 4A.

DETAILED DESCRIPTION OF THE INVENTION

Figure 1A:
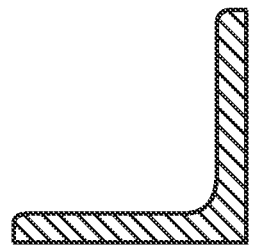
FIG. 1A is a cross section of an angle beam that may be used in the art to span building spaces.
Figure 1B:
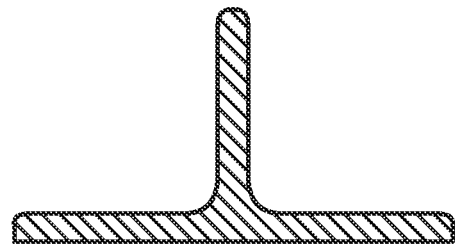
FIG. 1B is a cross section of a T-beam that may be used in the art to span building spaces.
Figure 1C:
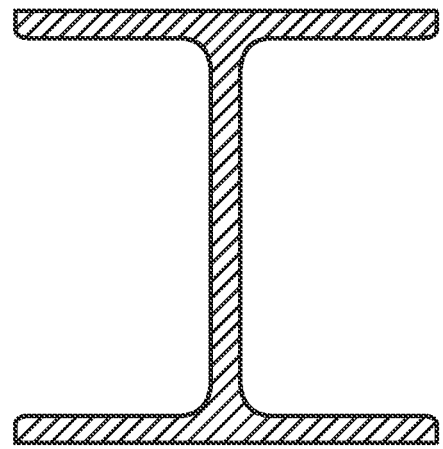
FIG. 1C is a cross section of an I-beam that may be used in the art to span building spaces.
Figure 1D:
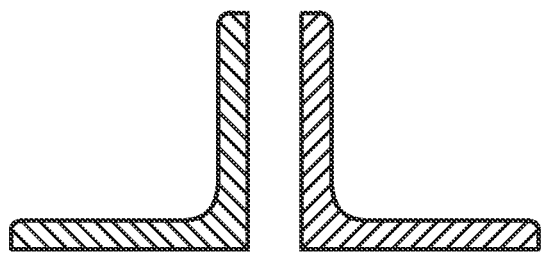
FIG. 1D is a cross section of two angle beams spaced back-to-back that may be used in the art to span building spaces.

There are a relatively wide variety of ways in which metal beams may be used to span a building space. FIGS. 1A through 1D illustrate some of the variations in the prior art. FIG. 1A is a cross section of an angle beam, FIG. 1B is a cross section of a T-beam, FIG. 1C is a cross section of an I-beam, and FIG. 1D is a cross section of two angle beams spaced apart back-to-back spanning a building space.

Figure 2A:
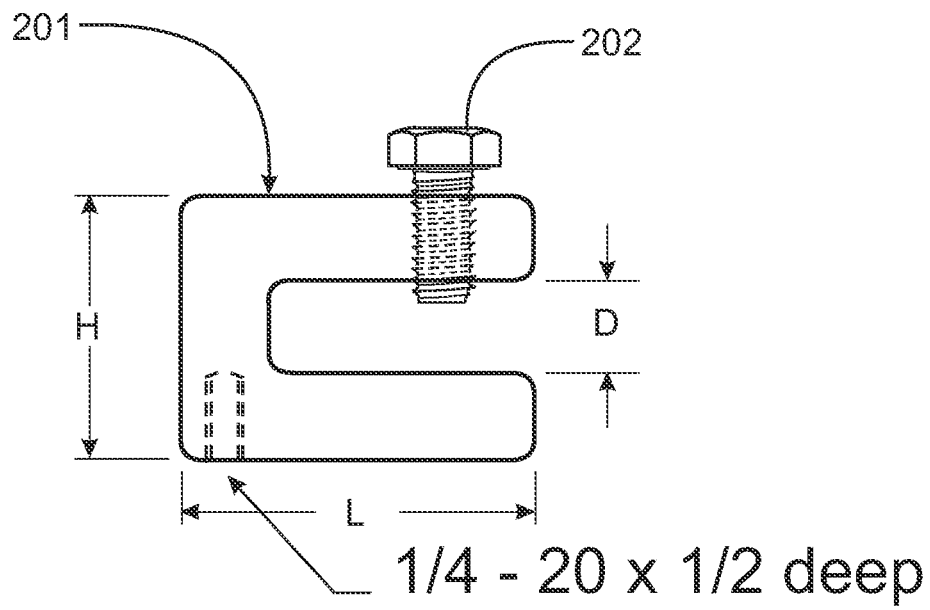
FIG. 2A is a side elevation view of a conventional beam clamp in the art.
Figure 2B:
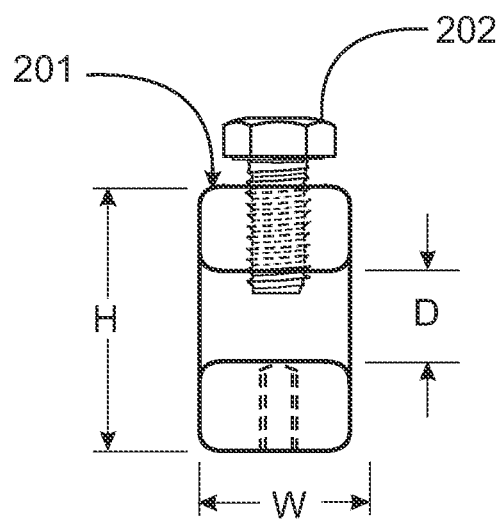
FIG. 2B is an end elevation view of the conventional beam clamp of FIG. 2A.
Figure 3A:
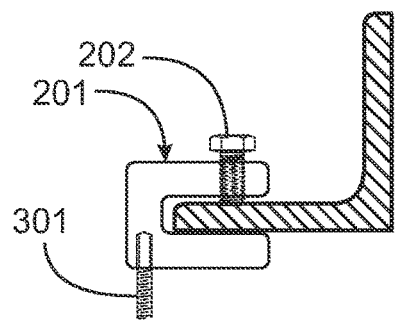
FIG. 3A is a cross section of an angle beam with a conventional beam clamp attached.
Figure 3B:
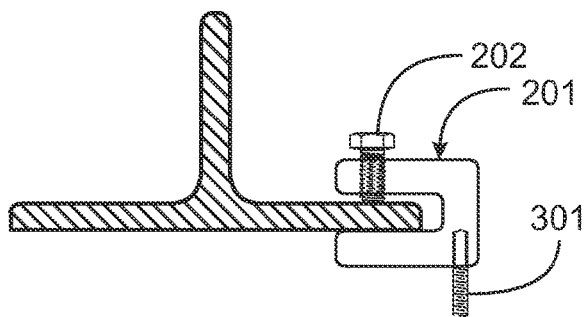
FIG. 3B is a cross section of a T-beam with a conventional beam clamp attached.
Figure 3C:
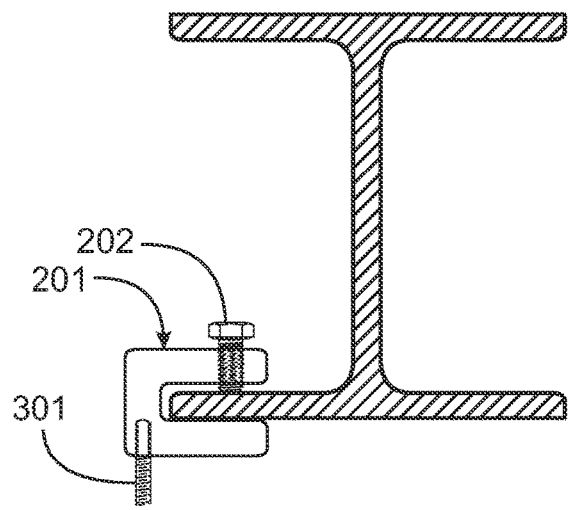
FIG. 3C is a cross section of an I-beam with a conventional beam clamp attached.
Figure 3D:
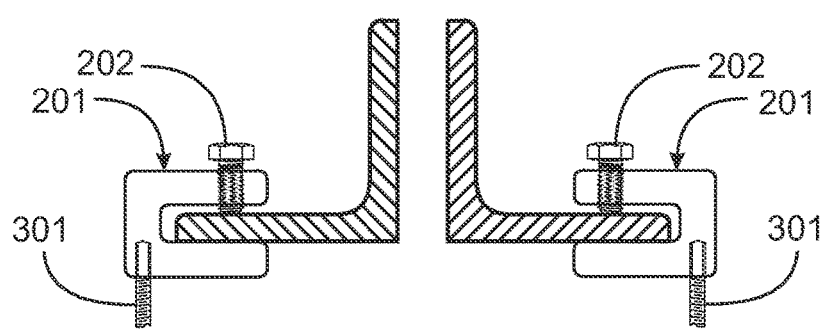
FIG. 3D is a cross section of two angle beams spaced back-to-back with conventional beam clamps attached.

FIG. 2A is a side elevation view of a conventional beam clamp 201 that may be clamped to any one of the beams in FIGS. 1A through 1D to provide an anchor for a threaded rod to be suspended vertically down into the building space, and FIG. 2B is an end view of the conventional clamp 201. In this example conventional clamp 201 has a height H that may vary depending on the particular beam to which it is intended, a length L that may vary the same way, and a gap dimension D that is sufficient to allow the clamp to be fitted to an end of a wing of the beam. A hex bolt 202 in this example passes through a threaded hole and provides a means to securely attach the clamp to a wing of a beam. A threaded hole is provided in an end of the clamp in this example having a ¼-20 thread×½ inch deep. This threaded hole is for a threaded rod that may be inserted in this hole and may extend down into the building space spanned by the beam, providing an anchor for electrical boxes and in some cases other apparatus to be placed in a wall in the building space.

FIGS. 3A through 3D is a copy of FIGS. 1A through 1D with conventional beam clamps 201 shown attached by hex bolt 202 to wings of the beams shown in cross section in FIGS. 1A through 1D. It may be seen that in the attachment of a beam clamp 201 to a wing of a beam a threaded hole is presented outside the end of the wing of the beam to which a threaded rod. 301 may be joined. The threaded rod may be of a length to extend down into the building space spanned by the beam(s).

It may be seen in FIGS. 3A-3D that the conventional beam clamp has relatively limited use. The conventional beam clamp cannot be employed on a vertical wing of a beam because it has no threaded hole that would be vertical in that deployment. The conventional beam clamp is also limited to a threaded rod that matches the thread of the single hole in the conventional beam clamp.

FIG. 4A is a side elevation view of a substantially C-shaped universal beam clamp 401 in an embodiment of the present invention, with a clamp screw 402 in a threaded hole passing through one portion (labeled "A") of the clamp into a central channel 404. In FIG. 4A the three portions of the C-shape are labeled "A", "B" and "C". Universal beam clamp 401 may be composed of different suitable materials in different embodiments, usually metal. The beam clamps may be made of cold rolled steel, stainless steel, cast iron, aluminum, or in special cases some other metal.

FIG. 4B is a rear end view of the universal beam clamp and clamp screw. FIG. 4C is a side elevation view opposite the side of the universal beam clamp and clamp screw of FIG. 4A. FIG. 4D is a front-end view of the universal beam clamp and clamp screw. FIG. 4E is a bottom view of the universal beam clamp. And FIG. 4F is a top view of the universal beam clamp and clamp screw.

The universal beam clamp illustrated in FIGS. 4A through 4F has six outer surfaces, and all six outer surfaces are presented face-on in the various views 4A through 4F. Referring now to FIG. 4F, two threaded holes are indicated near the rear end of the clamp. One hole is indicated as having a thread of ¼-20 by ½ inch deep, and the other as ⅜-16 by ½ inch deep. The threads per inch may be as shown or finer. A fine thread for ¼ inch is 28 threads per inch. For the ⅜ threaded hole the fine thread may be 24 threads per inch. The two threaded holes are placed side-by side in this example across thickness "T" of the universal beam clamp, so dimension "T" is at least ¾ inches. The placement and spacing may be somewhat different as well, as long as there are two holes at a right angle into the surface, with the two different thread sizes. This feature of the invention provides for using either a ¼ inch threaded rod or a ⅜ inch threaded rod suspended from a clamp on a wing of an overhead beam.

The sizing and spacing of the two threaded holes are repeated in three other of the six surfaces of the universal beam clamp, as may be seen in FIGS. 4B, 4D and 4E. There are thusly four sets of threaded holes, for eight threaded holes total in the universal beam clamp. There are no threaded holes in the sides of the universal beam clamp.

Universal beam clamp 401 has one other important feature that distinguishes it from a conventional beam clamp. The threaded hole for the clamp screw 402 is not at a right angle to the slot in the clamp for engaging a wing of a beam. The threaded hole is at angle with the slot, in this example about 20 degrees. This angle may vary in different embodiments from about 10 degrees to about 30 degrees. The clamp screw thusly impinges the wing of a beam at the angle of the threaded hole. In some embodiments the upper portion of the universal beam clamp above the slot that engages a web of a beam may be angled as shown, but this is not a limitation in the scope of the invention, The upper portion may be straight as in the conventional clamp. It is the angle of the clamp screw that is more important.

Figure 5A:
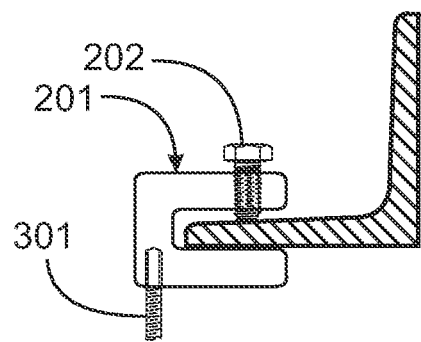
FIG. 5A shows a conventional beam clamp engaged to a tapered wing of a beam.
Figure 5B:
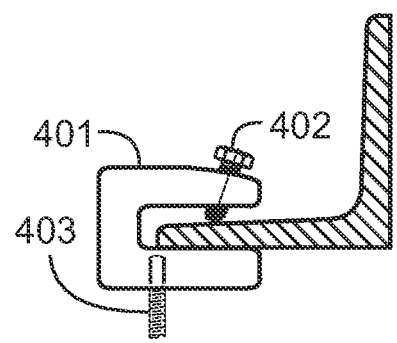
FIG. 5B shows a universal beam clamp engaged to the same beam as in FIG. 5A.

In some beams the webs are somewhat tapered, and the clamp screw of a conventional beam clamp, at 90 degrees to the web, tends to push the conventional beam clamp away from the web, loosening the clamp. FIG. 5A shows a conventional beam clamp engaged to a tapered wing of a beam, and it will be apparent that the way the clamp screw impinges the web of the beam that there may be a component of force tending to push the clamp away from the beam. FIG. 5B illustrates a universal beam clamp in an embodiment of the invention clamped to the same wing of the beam. It will be apparent that the angle of impingement of the clamp screw in FIG. 5B will provide a component of force to tend to push the clamp screw further onto the web of the beam. A threaded rod 403 is shown engaged to one of the threaded holes in universal clamp 401, extending downward to be available for mounting such as an electrical box.

Figure 6A:
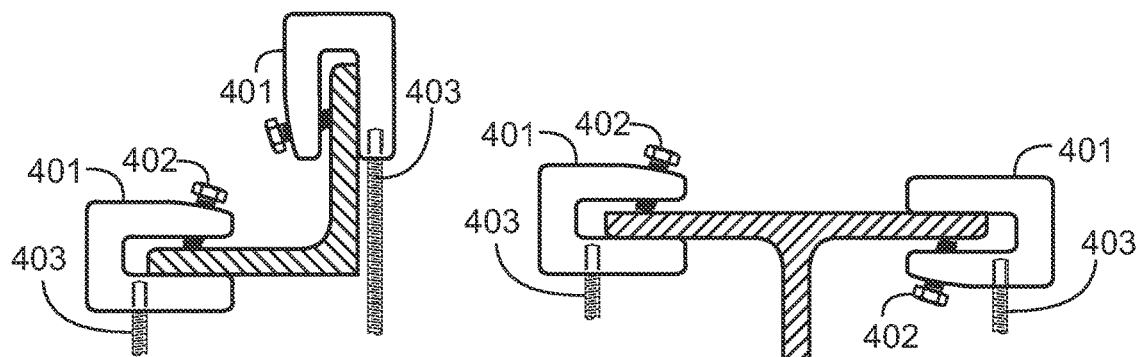
FIG. 6A shows universal beam clamps engaged to an angle beam in an embodiment of the invention.
Figure 6C:
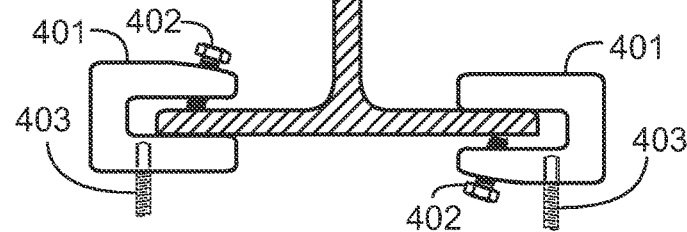
FIG. 6C shows universal beam clamps engaged to an I-beam in an embodiment of the invention.
Figure 6B:
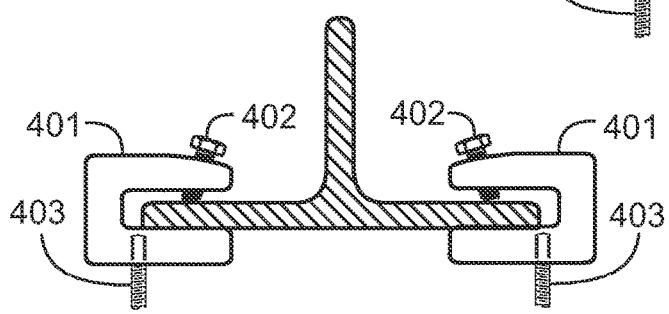
FIG. 6B shows universal beam clamps engaged to an T-beam in an embodiment of the invention.
Figure 6D:
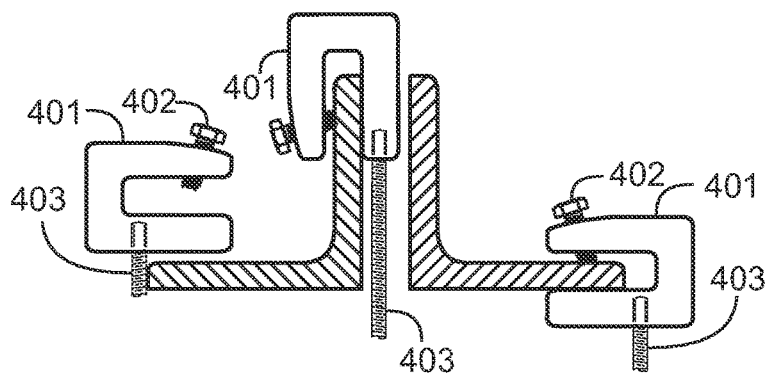
FIG. 6D shows universal beam clamps engaged to a set of angle beams in an embodiment of the invention.

FIGS. 6A through 6D illustrate beams of different sorts, as in FIGS. 3A through 3D. In FIGS. 6A through 6D a universal beam clamp according to an embodiment of the invention is shown engaging webs of the beams in a number of instances. Of particular importance is the illustration of a universal beam clamp 401 in FIG. 6A engaging a vertical wing of the angle beam, providing a threaded rod 403 vertically into the building space. This implementation cannot be accomplished with a conventional beam clamp. Similarly, referring to FIG. 6D, illustrating two angle beams spaced apart back-to-back. A universal beam clamp may be engaged to a vertical wing of either one of the two angle beams. It is necessary that the spacing of the two beams be such that the bottom portion of the universal beam clamp that fits in the space between the beams is of a dimension less than the spacing. Another advantage for the universal beam clamp is that, in the case of back-to-back beams as shown in FIG. 6D, if dimension "T" (see FIG. 4B) of the universal beam clamp is less than the spacing between the beams, then a universal beam clamp my be joined to a threaded rod and maneuvered upward between the spaced apart beams, then rotated ninety degrees and engaged to the vertical wing of one of the beams.

It is noted that the universal beam clamp as detailed in FIGS. 4A through 4F has in one embodiment, on each of the four faces that exhibit threaded holes, two threaded holes of a different thread size, side by side. This important feature provides to a user a choice of threaded rod to use in each installation. The provision of two threaded holes side by side is not, however, a limitation to the scope of the invention. In some embodiments universal beam clamps may have single threaded holes in each of the four faces.

A skilled artisan will understand that the embodiments illustrated and described in this application are all exemplary, and not limiting to the scope of the invention. There are actually many variations and alterations that may be made in various embodiments within the scope of the invention. The scope is limited only by the claims.

The invention claimed is:

1. A universal beam clamp, comprising:
a C-shaped body having a central channel open on a first end of the body, the body presenting a planar bottom face, a planar top face parallel to the planar bottom face, a planar closed-end face at a right angle to the planar top and bottom faces, two planar open-end faces at a right angle to the planar top and bottom faces, and two parallel opposite side faces, the central channel of a constant height, providing an upper and a lower planar inner surface parallel to the planar top and bottom surfaces;
a threaded hole through a first portion of the body to one side of the central channel, proximate the first end, an axis of the threaded hole extending through the planar top surface into the central channel;
a clamp screw engaged in the threaded hole into the central channel; and
two threaded holes of different thread size at a right angle into the body on the closed end face, two threaded holes of different thread size at a right angle into the body on one of the open end faces, two threaded holes of different thread size at a right angle into the body on the top face, and two threaded holes of different thread size at a right angle into the body on the bottom face, proximate a second end of the body
wherein the universal beam clamp has threaded holes with axes in four mutually orthogonal directions enabling a threaded hole to be directed vertically downward for a threaded rod from the universal beam clamp secured to any edge of an overhead beam.

2. The universal beam clamp of claim 1 wherein, of the two threaded holes, one is for a one-quarter inch thread and the other is for a three-eighths inch thread.

3. The universal beam clamp of claim 1 wherein the first portion of the body to one side of the central channel is tapered toward the open end.

4. The universal beam clamp of claim 1 wherein the beam clamp is made of one of cold-rolled steel, stainless steel, cast iron or aluminum.

5. The universal beam clamp of claim 1 wherein the clamp screw is a hex head bolt.

6. The universal beam clamp of claim 1 wherein the axis of the threaded hole through the first portion of the body is inclined at an angle to the direction of the central channel.

7. The universal beam clamp of claim 6 wherein the angle of inclination is between ten and thirty degrees and the axis is inclined toward the closed end.

8. A method for suspending a threaded rod from an overhead beam into a building space, comprising:
engaging a universal beam clamp having a C-shaped body with a central channel open on a first end of the body, the body presenting a planar bottom face, a planar top face parallel to the planar bottom face, a planar closed-end face at a right angle to the planar top and bottom faces, two planar open-end faces at a right angle to the planar top and bottom faces, and two parallel opposite side faces, a threaded hole through a first portion of the body to one side of the central channel, proximate the first end, an axis of the threaded hole extending through the planar top surface into the central channel, a clamp screw engaged in the threaded hole into the central channel, two threaded holes of different thread size at a right angle into the body on the closed end face, two threaded holes of different thread size at a right angle into the body on one of the open end faces, two threaded holes of different thread size at a right angle into the body on the top face, and two threaded holes of different thread size at a right angle into the body on the top face, proximate the second end of the body, over a wing or web of the overhead beam, such that two threaded holes of different thread size face vertically downward, regardless of which wing or web of the overhead beam is engaged;

tightening the clamp screw securing the universal beam clamp to the wing or the web of the overhead beam; and engaging a threaded rod into one of the two threaded holes facing vertically downward.

9. The method of claim 8 wherein one of the two threaded holes facing vertically downward is for a one-quarter inch thread and the other is for a three-eighths inch thread, comprising engaging a one-quarter inch threaded rod into the one-quarter inch threaded hole.

10. The method of claim 8 wherein one of the two threaded holes facing vertically downward is a one-quarter inch thread and the other is a three-eighths inch thread, comprising engaging a three-eighths inch threaded rod into the three-eighths inch threaded hole.

11. The method of claim 8 wherein a wing or web of the overhead beam extends vertically upward, comprising engaging the universal beam clamp over the vertically upward extending wing or web, providing two threaded holes in one of the open ends of the universal beam clamp to face vertically downward, and engaging a threaded rod into one of the two threaded holes in the open end of the universal beam clamp, such that the threaded rod extends vertically downward into the building space.

* * * * *